(12) United States Patent
Sutherland

(10) Patent No.: US 7,750,066 B2
(45) Date of Patent: Jul. 6, 2010

(54) TREATMENT OF AQUEOUS COMPOSITIONS CONTAINING CONTAMINANTS

(76) Inventor: George Sutherland, 2 Garland Court, P.O. Box 69000, Fredericton, New Brunswick (CA) E3B 6C2

(*) Notice: Subject to any disclaimer, the term of this patent is extended or adjusted under 35 U.S.C. 154(b) by 1161 days.

(21) Appl. No.: 11/365,615

(22) Filed: Mar. 2, 2006

(65) Prior Publication Data

US 2006/0148933 A1    Jul. 6, 2006
US 2007/0244225 A9    Oct. 18, 2007

Related U.S. Application Data

(63) Continuation of application No. PCT/CA2004/001617, filed on Sep. 2, 2004.

(30) Foreign Application Priority Data

Sep. 3, 2003    (CA) .................................... 2439436

(51) Int. Cl.
    *C08J 3/00* (2006.01)
(52) U.S. Cl. ..................................................... 523/336
(58) Field of Classification Search ................. 523/336
    See application file for complete search history.

(56) References Cited

U.S. PATENT DOCUMENTS

| 3,663,727 A | 5/1972 | Yamamoto |
| 3,790,521 A | 2/1974 | McCann et al. |
| 3,798,194 A | 3/1974 | McCann et al. |
| 3,801,551 A | 4/1974 | Bohme |
| 4,323,519 A | 4/1982 | Mori |
| 4,747,954 A | 5/1988 | Vaughn et al. |
| 5,447,643 A | 9/1995 | Kelkenberg et al. |
| 5,512,175 A | 4/1996 | Saito |
| 2002/0058732 A1* | 5/2002 | Mistry et al. ................. 523/201 |
| 2003/0092799 A1* | 5/2003 | Koenraadt et al. ........... 523/336 |

FOREIGN PATENT DOCUMENTS

| EP | 0 344 971 | 12/1989 |
| GB | 1 364 873 | 8/1974 |

* cited by examiner

*Primary Examiner*—Edward J Cain
(74) *Attorney, Agent, or Firm*—McFadden, Fincham

(57) ABSTRACT

The present invention provides for a method of producing a composition containing a polymer having undergone phase inversion, the method comprising the step of: effecting phase inversion of a phase invertible water insoluble polymer in an aqueous composition and the composition comprises a mixture of at least two different substances, one of which is a water insoluble dispersible polymer having undergone phase inversion while the other is optionally a contaminant.

22 Claims, 1 Drawing Sheet

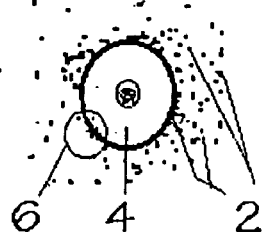
Figure 1
Figure 3
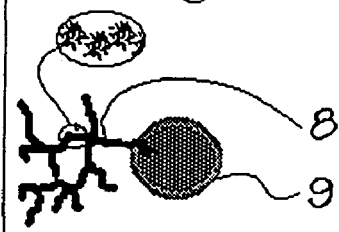
Figure 2
Figure 4
Figure 5
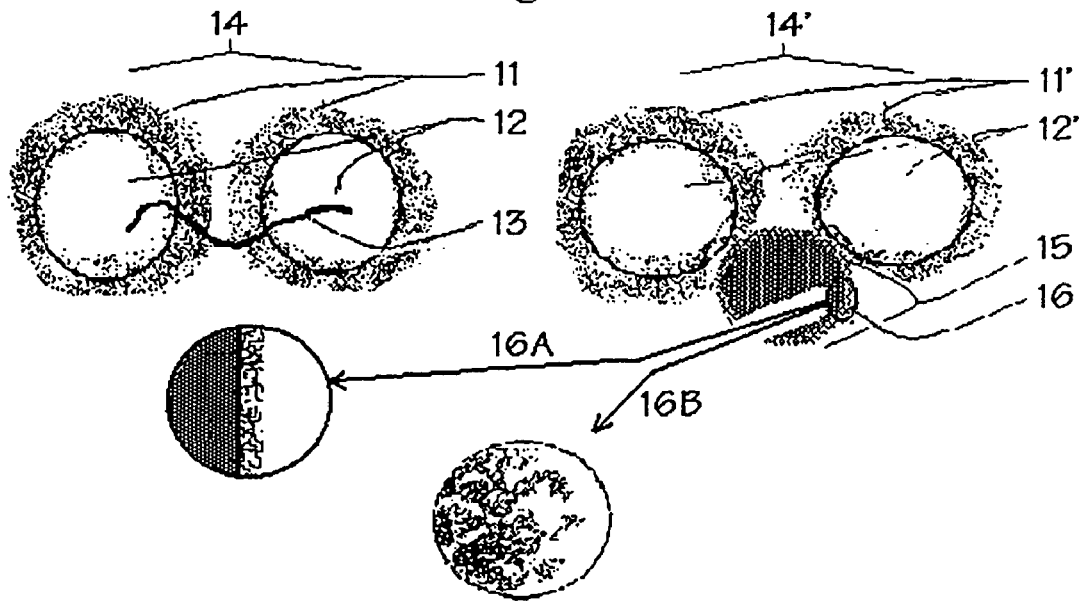

ent invention as
TREATMENT OF AQUEOUS COMPOSITIONS CONTAINING CONTAMINANTS

This application is a continuation of International Application No. PCT/CA2004/001617, filed Sep. 2, 2004, which claims priority of Canadian Patent Application No. 2,439,436, filed Sep. 3, 2003.

FIELD OF THE INVENTION

The present invention relates to methods for the manufacture and use of compositions derived from aqueous dispersions of water-insoluble polymers, many of which are believed to be new compositions of matter. The products are found useful in the processing of aqueous mixtures and are particularly suited to crude oil production, oily water processing, waste water treatment and water purification.

PRIOR ART

Preparations of Aqueous Polymer Dispersions

There are numerous methods for the preparation of aqueous dispersions of nano- and micro-sized polymer particles. Dispersions may be formed in situ, for example in aqueous emulsion polymerization of latex. Alternatively, polymers may be dispersed in separate, post-polymerization steps, for example alkaline dispersion of copolymers of ethylene acrylic acid (EAA). Dispersed polymer characteristics such as particle size, stability to re-agglomeration, viscosity and other properties useful in the target applications may be varied by control of preparation conditions such as mixing shear and/or additives such as surfactants.

Uses of Aqueous Polymer Dispersions

Water-based formulations containing emulsified and/or dispersed water-insoluble polymers, waxes, oils and so forth have found broad application as lubricants, adhesives, coatings and in processes for production of polymer composites and filters.

It is generally known that such dispersed materials may be flocculated via addition of soluble salts of metals such as aluminum, iron etc. However, the flocs thus produced are often disadvantageously voluminous, fragile, incompletely flocculated and/or difficult to separate from the treated water. Further, metal residues may remain dissolved in the treated water, requiring subsequent treatment to remove them.

Water-soluble flocculating polymers may be used in flocculation processes but such polymers present difficulties in preparation and use due to their high polymer molecular weight ("MW"), low rate of dissolution and high solution viscosity. Further, soluble flocculants typically cannot be regenerated from the flocs, leading to waste disposal issues. Still further, many soluble flocculating polymers are toxic and special measures may be needed to ensure complete polymer removal prior to use or discharge of the treated aqueous phase.

In the case of metal removal using aqueous polymer dispersions, only certain limited types of dispersed polymer have been taught. Typical prior art references include U.S. Pat. Nos. 5,447,643, 4,747,954, 3,798,194, 3,790,521 and 3,801,551. As disclosed in one or more of these references, aqueous dispersions or suspensions of solid carboxylic acid polymers such as ethylene acrylic acid (EAA) are introduced into aqueous compositions in order to effect metal removal by ion exchange.

The referenced processes may consume undesirably large amounts of polymer per unit of metal removed. For example, removal of aluminum would require addition of 40 times its weight of an EAA polymer of equivalent weight=360. Further, significant metal and polymer residues may remain in the treated aqueous phase. The prior art does not contemplate the concepts and methodologies of the present invention as applied to metals removal, and which result in significant enhancements in polymer performance.

Further, the prior art fails to anticipate that aqueous dispersions of insoluble polymers could be generally useful as flocculants for processing of non-metallic dissolved, suspended and/or liquid aqueous contaminants or phases, including oils, suspended solids, dissolved toxic organic materials and the like.

SUMMARY OF THE PRESENT INVENTION

In accordance with the present invention, methods have been developed involving the use of aqueous polymer dispersions ("APD") capable of undergoing phase inversion for the production of phase-inverted polymer compositions, which methods can be adapted for a wide variety of uses including treatment of contaminated water, crude oil fluids separation, etc. as discussed herein. Other applications include the manufacture of membranes and production of novel polymer compositions and structures. These aspects are detailed in a co-pending patent application.

The term "phase inversion" as used herein is defined as spontaneous or induced nano- and/or micro-polymer phase inversion, flocculation, catenation, gellation, sorption, complexation, precipitation and/or coalescence from a dispersed aqueous first form into a second form. The term "nanopolymer" as used herein refers to a dispersed polymer-water-additive aggregate, or catenated forms thereof.

Obviously, not all APD compositions will be phase invertible to yield a readily separated polymer phase and/or purified liquid phases(s). It has been found possible to modify such compositions via methods disclosed herein to form more readily phase inverted compositions and/or more readily separable polymer and treated liquid phase(s). Moreover, it will be clearly understood by those skilled in the art that "readily phase inverted" and "readily separable" are relative to the context of the specific process objectives and separation method desired. For example, formation of a neutral-buoyancy polymer-contaminant microfloc may be acceptable where membrane filtration systems are installed but unacceptable where flotation and/or screening is the separation method of choice.

In contrast to the homogeneous nature of conventional aqueous flocculating polymers, phase invertible APD polymers are substantially insoluble in the aqueous carrier and are present as finely divided particles containing hundreds or thousands of polymer chains forming a particulate structure. APDs do not exhibit the high bulk viscosity and other undesirable characteristics associated with a conventional aqueous polymer solution ("APS") of similar concentration, and mobile liquid APD containing 20 to 60 wt. % polymer can be readily prepared. Colloidal dispersions of water-soluble polyacrylamides are also known, but these are distinguished from the phase invertible APD in that the polyacrylamide particles form an APS upon dilution while APDs retain their particulate characteristics even at low aqueous concentrations.

The structure and physicochemical behaviour of phase invertible APD is influenced by numerous variables including pH, temperature, salinity, added particulates, polymer concentration, particle size, zeta potential, concentration of surfactant(s), concentration of co-reagents, concentration of dispersed non-aqueous fluid phases, mixing shear and so forth.

It is a further highly significant feature of the present invention that polymer-contaminant materials may often be readily separated, the concentrated contaminant recovered or disposed and the polymer re-dispersed, thus reducing polymer consumption and minimizing waste volumes generated. In contrast, APS/contaminant precipitates typically are not conveniently separated.

In accordance with one aspect of the invention, there is provided an improved method for removing a contaminant from an aqueous mixture containing the contaminant comprising the steps of: providing or forming an aqueous mixture containing a contaminant and an aqueous polymer dispersion, the polymer being a substantially water insoluble polymer and being capable of undergoing phase inversion or coalescence; forming an aqueous composition of the aqueous polymer dispersion and the aqueous mixture containing the contaminant; and effecting phase inversion or coalescence of the polymer in the aqueous composition to thereby form at least one contaminant precipitated phase and a treated aqueous phase.

In the above method, a preferred aspect further comprises the step of adding a precipitation agent to initiate phase inversion. Another preferred embodiment of this aspect includes the step of separating the precipitated phase from treated aqueous phase.

In a still further aspect of the present invention there is provided a method for, removing oil from an aqueous mixture containing oil comprising the steps of: providing an aqueous mixture containing oil; providing an aqueous polymer dispersion, the polymer being a substantially water insoluble polymer and being capable of undergoing phase inversion or coalescence; forming an admixture of the aqueous polymer dispersion and a weak base; and forming an aqueous composition of (a) the admixture of the polymer dispersion and the weak base and (b) the aqueous mixture containing the oil to thereby induce release of dispersed polymer from the paste into the aqueous phase followed by spontaneous or induced phase inversion of the polymer and form a solid floating oil precipitate on the surface of the aqueous composition.

In another aspect of the present invention there is provided a method of separating a fluid mixture comprising the steps of: providing a fluid mixture; providing an aqueous polymer dispersion, the polymer being a substantially water insoluble polymer and the polymer being capable of undergoing a phase inversion; mixing the dispersion with the fluid mixture; effecting the phase inversion to yield solidified, coalesced or gelled polymer phase and one or more coalesced fluid phase(s); and separating the phase(s).

In the preceding method, a preferred embodiment is where the precipitation agent is added to the aqueous polymer dispersion to form an intermediate composition prior to addition of the intermediate composition to the aqueous mixture.

In various of the above methods there is preferably included the step of separating a precipitated phase by a process selected from one or more of magnetic separation, sedimentation, flotation, centrifugation, hydrocyclone treatment, screening, filtration, skimming, distillation, drying, differential pressure press-filtration and membrane permeation processes. Another aspect of this embodiment preferably comprises the step of selectively heating or electromagnetically treating the precipitated phase prior to or simultaneous with the separation step.

In the above and subsequently described methods, the invention may be used for treatment of aqueous mixtures containing a wide range of contaminants such as colloidal solid or liquid, emulsified oil, free-phase oil or hydrocarbon, dissolved gas, dispersed gas, edible or essential oil, tar, bitumen, fat, dissolved metal, chelated metal, precipitated metal, dissolved organic substance, surfactant, soluble polymer, paint, carbon, clay, colour, protein, pharmaceutical agent, biocide, biological fluid fraction, fermentation fraction, blood, fertilizer, food residue, alkyl amine, ethoxylated alkyl amine, phenol or derivative thereof, aromatic hydrocarbon, halogenated hydrocarbon, sulfonated hydrocarbon, carboxylic acid, soap, micelle, natural product, radionuclide; latex; and ore particles.

In the preceding methods, preferred embodiments are where at least one process condition selected from pH, temperature, shear, mixing rate, residence time, addition rate, ionic type and concentration, soluble polymer type and concentration, oil type and concentration, dispersed gas concentration, dispersed solid concentration, microwave intensity, is controlled during the method.

If desired, following the various methods of the present invention described hereinabove or hereinafter, the polymer can be recovered and used again. Suitable recovery techniques include e.g. filtration, flotation, sedimentation, centrifugation, etc. Conveniently, undesirable levels of contaminants can be removed prior to re-use.

In the embodiment of the present invention where a gas generating composition is employed, any suitable agent compatible with the aqueous composition or admixture may be employed. Such agents may be added in solid or liquid forms. Typical agents can be various carbonates and bicarbonates such as ammonium carbonate, sodium carbonate, etc. The amount of agent added will vary depending on the intensity and amount of gas generation desired.

In carrying out phase inversion, any suitable treatment or additive may be employed including: addition of acid, soluble metal salt, soluble flocculant, dispersed oil, colloidal organic solid, colloidal inorganic solid, fibrous material, porous material, dissolved and/or dispersed gas phase; heating; cooling; dilution; exposure to electromagnetic radiation or ultrasonic treatment, varying mixing shear, turbulence or any combination of the foregoing, simultaneously or sequentially. The selection of the treatment or additive will depend on the nature of the dispersed polymer and aqueous phase as well as process conditions and desired solid-liquid separation method. The initiating agent may be added to the aqueous solutions prior to the addition of the polymer in certain cases. The amount of initiating agent will vary depending on several factors—e.g. the amount and nature of the polymer used, the amount and nature of contaminant, pH and temperature conditions, etc.

In some cases, addition of a precipitating agent or agent which initiates phase inversion may not be required where the mixture flocculates spontaneously after addition of the polymer dispersion.

In a still further aspect of the present invention, there is provided a method of enhancing a flotation process comprising the step of adding an aqueous polymer dispersion to the mixture during the process, the polymer of the dispersion being a substantially water insoluble polymer and being capable of undergoing phase inversion.

Another embodiment of the present invention relates to a method of enhancing a sedimentation process comprising the step of adding an aqueous polymer dispersion to the mixture during the process, the polymer of the dispersion being a substantially water insoluble polymer and being capable of undergoing phase inversion.

In a different embodiment of the present invention, there is provided a method of enhancing a phase coalescence process comprising the step of adding an aqueous polymer dispersion to the mixture during the process, the polymer of the dispersion being a substantially water insoluble polymer and being capable of undergoing phase inversion.

In various embodiments of the present invention, the polymer dispersions can be mixed by suitable means or process steps with the aqueous mixture to form a composition, with separation of a solid precipitate from the resulting treated phase. Typical mixing methods include mechanical agitation, ultra-sonic mixing, magnetic stirring, static mixers, etc. The intensity of mixing will depend on the nature of the admixture and whether or not high or low shear is employed will likewise depend on several factors, such as the nature of the contaminants, the characteristic properties of the resulting floc as to whether it is of a fragile or a robust nature. Suitable techniques are well known in the flocculating art for handling such floc types.

Another aspect of the present invention involves a method of removing a contaminant from an aqueous contaminant spill comprising the steps of: locating an aqueous spill at a site containing the contaminant; providing an aqueous polymer dispersion, the polymer being capable of undergoing phase inversion and being a substantially water insoluble polymer; applying the aqueous polymer dispersion to the aqueous spill and permitting the polymer dispersion to undergo a phase inversion to effect solidification and immobilization of the contaminant with the polymer and form a solid precipitate; and removing the solid precipitate from the spill. In this method, preferably there is included the step of adding a precipitation agent to initiate the phase inversion.

The invention also provides, in another embodiment, a method of in-situ leak reparation comprising the steps of: providing an aqueous polymer dispersion, the polymer being capable of undergoing phase inversion and being a substantially water insoluble polymer; injecting the aqueous polymer dispersion to a subsurface source having an aqueous contaminant leak, and in which the contaminant is contained within the aqueous mixture; effecting polymer phase inversion to form a solid precipitate of contaminant with the polymer; and permitting the solid precipitate to seal the leak. In this method, preferably there is included the further step of adding a precipitation agent to initiate phase inversion.

In another aspect of the present invention, there is also provided a method of removing a contaminant from soil comprising the steps of: providing a soil containing oil or other contaminant leachable therefrom; providing an aqueous polymer dispersion, the polymer being capable of undergoing phase inversion and being a substantially water insoluble polymer; mixing together, under conditions which substantially inhibit deposition of polymer onto the soil surfaces, the aqueous polymer dispersion, the soil containing the contaminant, water and a surfactant to cause the contaminant to enter the aqueous phase; and separating soil from the resulting aqueous phase.

In preferred embodiments of the above described method, phase inversion is utilized to solidify the contaminants with the polymer and separating water from the solidified contaminants. In some cases, it may be desirable to add a solvent to increase extraction rate and or efficiency of the extraction.

In related aspects of the present invention, there is also provided a method of preparing an aqueous polymer dispersion with improved characteristics comprising the steps of: providing a first aqueous polymer dispersion in which the polymer is substantially water insoluble; adding a substance at a controlled pH and temperature sufficient to form a second aqueous polymer dispersion having improved properties over the first aqueous polymer dispersion. Desirably, the added substance is selected from the group consisting of: acid, multivalent metal, cellulose, bitumen, rubber, oil, colloidal organic or inorganic solid.

In a still further development, there) is also provided a method for the solvent extraction of metals from an aqueous mixture comprising the steps of: providing an aqueous mixture containing metals and emulsified solvent-chelant; providing an aqueous polymer dispersion, the polymer being substantially water insoluble and being capable of undergoing phase inversion; mixing the dispersion with the aqueous mixture; creating a polymer phase inversion; and separating the resulting polymer solid from the extracted solution.

There is also provided a method of enhancing dewatering of a hydrous floc comprising: providing a hydrous floc; providing an aqueous polymer dispersion, the polymer being a substantially water insoluble polymer and being capable of undergoing phase inversion or coalescence; forming an aqueous composition of the aqueous polymer dispersion and the hydrous floc; and effecting phase inversion or coalescence of the polymer in the aqueous composition to thereby form a second floc with improved dewatering properties.

Moreover, the present invention also provides a method for the selective extraction of metals from aqueous solution comprising the steps of: providing an aqueous metal solution containing at least two different metals dissolved therein; providing an aqueous polymer dispersion of a substantially water insoluble polymer, the polymer being capable of phase inversion; mixing the dispersion with the metal solution; inducing polymer phase inversion under conditions to preferentially incorporate one of the metals into polymer solids resulting from phase inversion while the other metal remains substantially in dissolved form; and separating the polymer solids from the selectively extracted solution.

Another aspect of the present invention provides a method for enhancing a solvent extraction process comprising: providing an aqueous solvent mixture; providing an aqueous polymer dispersion, the polymer being capable of undergoing phase inversion and being substantially water insoluble; mixing the aqueous solvent mixture and the polymer dispersion to effect a polymer phase inversion and form a polymer solvent extract solid and extracted water phase substantially free of solvent.

Still further, the present invention teaches a method for the extraction of a soluble substance from water comprising the steps of: providing an aqueous polymer dispersion, the polymer being substantially water insoluble and being capable of phase inversion; providing an aqueous solution containing a substance to be extracted; mixing the dispersion and solution such that polymer phase inversion occurs; and producing a solid phase containing the substance and extracted water phase.

Moreover, there is also disclosed herein a method of purifying a dispersable polymer comprising the steps of: providing a dispersable polymer to be purified, the polymer being substantially water insoluble and being capable of undergoing phase inversion; preparing a dilute aqueous dispersion of the polymer; inducing a phase inversion in the dispersion; and separating purified polymer. Desirably, the preceding method includes the step of preparing an aqueous dispersion from the purified dispersable polymer.

The invention also provides for a new method for producing polymer-additive solids with improved dispersibility comprising the steps of: providing an aqueous polymer dispersion-additive mixture, the polymer being substantially water insoluble and being capable of undergoing phase inversion; inducing a phase inversion under conditions to form a polymer-additive solid intermediate; separating the intermediate solid; re-dispersing the intermediate solid; removing undispersed material; inducing a phase inversion; and isolating the refined solid, the refined solid exhibiting improved dispersibility characteristics.

In general terms, the invention also provides a method of inducing a phase inversion in a mixture containing an aqueous polymer dispersion or flocculated slurry comprising: providing an aqueous polymer dispersion or flocculated slurry derived therefrom, the polymer being substantially water insoluble and being capable of undergoing phase inversion, and adjusting the pH of the slurry to thereby form a polymer product having enhanced contaminant removal capability. In particular, such enhanced capabilities include properties such as increased contaminant removal, increased separation efficiency, increased selectivity for target contaminants. Thus, for example, selective removal of copper is enhanced by addition of calcium ions, metal removal capacity can be increased by addition of e.g. hydroxide ions.

Another embodiment of the present invention provides a method of particulate flocculation comprising: providing an aqueous mixture containing particulates, providing an aqueous polymer dispersion and mixing the polymer dispersion with the aqueous mixture.

Still further, there is also disclosed a method of forming a metastable or activated form of an aqueous polymer dispersion or slurry comprising: providing an aqueous polymer dispersion, providing an aqueous mixture containing one or more from the group comprising acid and multivalent metal and mixing the aqueous mixture into the dispersion. Such metastable dispersions may have lifetimes long enough to permit manufacture at a first site and transportation to a second site for use.

Certain embodiments of the present invention can involve or can be based on one or more of (a) direct contaminant sorption by the phase-inverted polymer surfaces and/or permeation into the polymer structure, (b) coalescence and/or flocculation induced by very high surface area polymer structures; (c) solid or liquid contaminant-polymer catenation, and/or (d) liquid and particulate entrapment, sorption and/or microencapsulation within the flocculated polymer macrostructure.

Clear distinctions exist between aqueous polymer solution ("APS") and APD structures and properties. Unlike the solvated monomeric polymer chains in APS, the colloidal structures of APD may contain several hundreds to several thousands of individual polymer chains, with this assembly having some of the characteristics of polymers of very high MW (up to tens of millions). However, APD structures do not exhibit the high bulk viscosity and other undesirable characteristics associated with an APS of similar effective MW. APS do not contain colloidal structures in sufficient concentration for utility in the processes hereinafter discussed. However, it is noted that APSs may react with suitable materials to form an APD-like structure in-situ.

The structure and physicochemical behaviour of APDs is strongly influenced by numerous variables including pH, temperature, salinity, zeta potential, multivalent cations, concentration of polymer, co-reagents and/or non-aqueous phases and so forth. Control of suitable variables allows APDs of various nanopolymer structures to be prepared; these have been found to be of utility in removing contaminants from aqueous mixtures via phase inversion of the APD to form polymer solids containing the contaminants.

Utility

The present invention finds wide utility for numerous uses. One prominent use is the application of the method to remove contaminants from aqueous mixtures for various purposes, such as plant stream clean up, purification of aqueous mixtures containing contaminants to recover the contaminants and provide a potential feed stream for re-use in various processes or industries, etc. Other applications of the present invention relate to oil spill clean-ups, use of the methods of the present invention also finds application for land-based spills involving e.g. oil, which will provide a solidified oil fraction, which is then easily removed from a spill site.

In the case of contaminant spills such as oil spills into a body of water, utilization of the methods of the present invention will result in a polymer-contaminant solid which floats on the water body and thus may be removed by well-known surface skimming/screening techniques. In the case of oil spills in water bodies, the present invention also finds use where it has been determined that the oil-water mixtures resulting from such a spill can be gelled using relatively small amounts of the polymers described herein, in combination with high shear mixing. In other words, a polymer is added to the oil-water mixture and after phase inversion together with high shear mixing gelled emulsions will result which will have the consistency of a stiff whipped cream. Such compositions can be stable for up to several days which would permit cleanup operations to be employed (e.g. using boom deployments). This particular technique has the advantage that many times the weight of the polymer in terms of contaminant, can be immobilized.

Other uses of the methods of the present invention include metal removal from aqueous compositions as well as use in providing in-situ leak repairs. The invention can also be used to prepare aqueous polymers dispersions having improved chemical and/or physical characteristics. Selective extraction of metals is also possible using the present invention as well as purification of dispersible polymer. The methods of the present invention provide significant improvements over the prior art, particularly as to the efficiency of the present methods in removing contaminants from aqueous mixtures.

Polymers

In the present invention, the polymers which can be employed are those which are substantially insoluble in water and are dispersible therein and which are capable of undergoing phase inversion. Such polymers can be chosen from a very wide range of known polymers, preferred classes of which are identified hereinafter.

Alternatively, the substantially water insoluble polymer can be one which is capable of coalescing once mixed in an aqueous solution containing a contaminant to undergo transformation to a non-dispersed-form. As used herein, the term "dispersible polymer" refers to a polymer which in an aqueous mixture, forms with the aqueous mixture, a two phase system in which one phase is water with the other phase being composed of very small particles of polymer, either in a solid, liquid or gel state.

It has been found that a wide variety of physical forms and compositions of polymers derived from colloidal aqueous dispersion may be employed in the present invention, e.g. micro-emulsion; micro- or macro-fibrous, membranous or particulate slurry or suspension; porous solid or gel. As such, the polymer compositions which can be used in the present invention may include liquid polymers such as paraffins, oils, silicones, polyglycols, latexes, and so forth, and solid polymers which are fibrous or resinous polymers as well as a wide range of thermoplastic polymers. With respect to solid polymers, preferably they are used in the present invention in highly porous, permeable, swellable and/or finely divided particulate form; more desirably such polymers are micronized polymers having a particle size which can range, desirably, to between about 1 to about 50 microns.

A most preferred embodiment of the present invention utilizes dispersed nano sized particles for more desirable results—such particles may range from about 1 to 50,000 nanometers, desirably 2 to 20,000 nanometers, with the most preferred range being 3 to 2000 nanometers.

In general terms, the polymers which may be employed in the present invention can be various types of water-insoluble polyamides, polyolefins, and particularly polyethylene or co-polymers of ethylene with one or more other monomers or polymers; in addition, oxidized polyolefins and in particular, highly oxidized polyethylenes; teflon polymers such as tetrafluoroethylene polymers and co-polymers, vinylacetate polymers such as polyvinyl acetate, or co-polymers of vinylacetate polymer; urethane polymers, e.g. polymers of isocyanate/polyol; styrene polymers and co-polymers and particularly carboxylated styrenes; acrylic acid polymers or co-polymers such as methacrylic acid co-polymers; polymers and co-polymers containing diene groups such as polystyrene-butadiene, polychlorobutadiene, polyvinylpyridines.

Clearly, the optimal polymer composition and/or form to be used may be tailored for specific feeds, as illustrated by the examples disclosed herein. Thus, certain polymer compositions and forms will be more suitable than others for different processes, e.g. oil-water separation vs. dissolved metals removal.

By way of example, the present invention can utilize solid, water-insoluble thermoplastic organic acid addition polymers which can be of a wide ranging chemical structure, provided that they have the physical properties and characteristics described above. Such typical polymers which may be acid polymers which are addition polymers of ethylenically unsaturated monomers where the starting monomers include one having an acid group of the kind specified. For example, suitable polymers are the random copolymer products of copolymerization of mixtures of one or more polymerizable ethylenically unsaturated carboxylic acids such as acrylic acid, methacrylic acid, maleic acid and anhydride, itaconic acid, fumaric acid, citraconic acid and anhydride, methyl hydrogen maleate, and the like, and one or more non-acid polymerizable monomers, such as ethylene, propylene, butene-1,1,3-butadiene, and other aliphatic olefins; styrene, α-methylstyrene, vinyltoluene, chlorostyrene, and other aromatic olefins; ethyl acrylate, methyl methacrylate, vinyl acetate and other unsaturated esters; vinyl and vinylidene chloride; vinyl ethers, acrylamide; acrylonitrile; and the like.

One class of suitable copolymers for use in the present invention includes: co-polymers of ethylene and from at least about 1% to about 25% by weight of one or more ethylenically unsaturated acids, such as acrylic acid, methacrylic acid, methyl hydrogen maleate, etc. as above recited; co-polymers of ethylene, from about 1 to about 25% by weight of one or more ethylenically unsaturated acids, and up to about 50% by weight of one or more other monomers such as ethyl acrylate, vinyl acetate, etc., as above recited; and co-polymers of styrene (and/or other ar-vinylaromatic compounds) and from about 3.5 to about 11% by weight of one or more ethylenically unsaturated acids such acrylic acid, maleic anhydride, etc., as above recited.

In addition, other polymers which can be used include preformed and non-acid polymers by subsequent chemical reaction carried out thereon. For example, the carboxylic acid group may be supplied by providing carboxylic anhydride, ester, amide, acyl halide, and nitrile groups which are then hydrolyzed to carboxylic acid groups.

Within the above defined groups of known polymers and co-polymers, reference may be made specifically to ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate (ternary) copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, styrene/acrylic acid copolymers, styrene/methacrylic acid copolymers, styrene/itaconic acid copolymers, styrene/methyl methacrylate/acarylic acid copolymers, styrene/maleic anhydride copolymers, styrene/citraconic anhydride copolymers, archlorostyrene/acrylic acid-copolymers, ar-t-butylstyrene/acrylic acid copolymers, methyl methacrylate/isobutyl acrylate/acrylic acid copolymers, wherein ar is an aryl group having 6 to 10 atoms.

In general terms, the amount and type of polymer(s) used will depend on numerous factors including feed type and contaminant concentration, feed conditions, desired rate, separation method to be employed, desired floc particle size and so forth. Generally speaking, since the nature of the feed may vary considerably, it will be understood that the optimal amount, form and composition of nanopolymer for processing of a specific feed will be readily determined and optimized by techniques well known in the art.

Oil-Polymer Dispersions:

It is known that addition of oil can facilitate preparation and/or increase stability of APDs. It has been found that oil-polymer dispersions have utility in certain processes discussed herein. It is therefore a feature of one embodiment of the present invention to prepare oil-polymer dispersions, slurries and solids with improved properties over commercially available dispersions for the processes described herein.

Other Applications:

In further embodiments of the present invention, the aqueous polymer dispersion, together with a precipitation initiator agent if required, may be applied onto spills to solidify and immobilize the contaminants, which may then be more easily recovered from a spill site. The aqueous polymer dispersion may also be injected with a precipitation initiator agent into subsurface sources of contamination including leaking landfills, underground fuel storage tanks or the like. Optionally, the polymer is injected at elevated temperature to form molten polymer which solidifies to a relatively impermeable mass on cooling. The polymer after flocculation and/or solidification acts to immobilize and solidify contaminants, while at the same time, forms a barrier to further leakage. In a preferred embodiment of the invention a water-soluble non-toxic acid and/or multivalent metal salt such as calcium chloride may be used as precipitation agent.

ADVANTAGES

The present invention provides advantages compared to prior art techniques. Specifically, the present invention provides compositions and methods for the convenient on-site or in-situ manufacture, optimization and use of nanopolymer dispersions and derivatives. Contaminated polymer flocs may be processed to separate potentially valuable 'contaminant' in concentrated form and to regenerate a dispersed nanopolymer for recycle. The simplicity of the processes of the present invention is another significant advantage over the prior art.

BRIEF DESCRIPTION OF THE DRAWINGS

Having thus generally described the invention, reference will now be made to the accompanying drawings illustrating preferred embodiments, and in which:

FIG. 1 is a schematic view of a nanopolymer-oil aqueous mixture;

FIG. 2 is a schematic view of a portion of FIG. 1 enlarged;

FIG. 3 is a schematic view of nanopolymer-oil floc agglomeration;

FIG. 4 is a schematic view of the condensed solid nanopolymer-oil matrix; and FIG. 5 is a schematic view of other flocculation mechanisms.

DETAILED DESCRIPTION OF THE INVENTION

Liquid Processing Using Nanopolymers

Polymer dispersions can be prepared separately from solid dispersable polymer(s) plus additive(s) prior to addition to the feed to be processed. Additive(s) were selected to optimize phase inversion characteristics for the feed to be processed. Alternatively, commercially available or prior art dispersions were used and modified with additive(s) prior to or during addition to the process stream.

Mixing and Separation Steps:

The dispersion can be injected into the feed with sufficient mixing to ensure good nanopolymer distribution prior to phase inversion. Alternatively, the method involves contacting or mixing pre-formed phase inversion solids or catenated nanopolymer slurry with the feed. Mixing is continued for the desired period at selected operating conditions, producing one or more polymer/contaminant phase(s) and purified water. The produced solid/gel/liquid phase(s) may then be removed from the aqueous solution by filtration, flotation or any other convenient process.

The separation step can be preceded by a residence time. Preferred residence times will vary according to the feed composition, polymer type, process conditions, separation method, etc. In cases where several different contaminants and/or phases are present, some components may more rapidly form separable phases than others, in which case it is possible to perform sequential selective separations. Further, the mixture may be treated during the residence time by methods of the present invention to optimize the microstructure of the nanopolymer solids for the desired separation method.

Contaminant Recovery and Regeneration of Polymer:

The contaminant and the polymer can be separated from each other by, eg. aqueous leaching, solvent extraction, re-dispersion followed by removal of non-dispersed solids, etc. Liquid oils may be recovered by squeezing the polymer-oil solids. The dispersion may then be regenerated from the purified solids.

EAA-Metal flocs may be acid-leached to yield a metal solution and extracted polymer. Alternatively, reaction with aqueous base gave dispersed polymer and hydrous metal oxide/hydroxide which was separated by settling/decantation. Acid leaching of aged metal-EAA solids of over ~95% EAA content was not efficient.

It was found that addition of an oil to the mixture prior to phase inversion facilitated some metal/polymer leaching and regeneration processes presumably by preventing or slowing the condensation of the polymer-metal structures into non-porous, non-leachable solids.

Polishing of Effluents:

Effluent water, brine or other treated fluid can be further purified or polished via additional treatment with APD according to the methods of the present invention and/or via application of known materials and techniques such as activated carbon treatment, vapour stripping, ion exchange, distillation, membrane technologies and the like.

Nanopolymer Flocculation Mechanisms

The interaction between dispersed polymers and emulsified or dispersed oil contaminant is illustrated in FIGS. 1 to 4. FIG. 1 represents dispersed polymer particles (represented by numeral 2) and oil droplets, one of which is represented by numeral 4. FIG. 2 represents an enlarged view of the surface of the oil droplet (numeral 4 in FIG. 1) during the phase inversion step. The initiation of phase inversion enables catenated polymer particulates (numeral 8; structure illustrated in the insert) penetration of the electric double layer surrounding the oil droplet surface (numeral 9), presumably via polar, charged and/or ionic surface species formed and/or adsorbed during phase inversion. Alternatively, the oil droplets when in relative abundance as compared to amount of nanopolymer present may coalesce with other oil droplets via destabilized polymer particles, similar to the particulate flocculation illustrated in FIG. 5 discussed hereinafter. Either initial step may be followed by further flocculation to more extended structures (FIG. 3) followed by subsequent contraction to a denser, less porous polymer-oil-water gel/solid (FIG. 4), releasing water and coalesced oil phases (not shown). Obviously, whether coalesced liquid oil is released will depend on oil:polymer ratio, polymer oil capacity at the operating temperature and many other variables.

FIG. 5 illustrates possible mechanisms for particulate flocculation by soluble polymers vs APD. Structure 14 illustrates dissolved polymer chain 13 bridging through electric double layers 11 between particles 12, binding the particles together, while 14' depicts an equivalent arrangement to 14, with insoluble polymer structure 15 acting to bridge between the particles. Alternatively, it is obvious that flocculation could proceed via interaction of the particles with a catenated polymer structure as illustrated in FIG. 2.

The polymer surface 16 is depicted in close-up in 16A and 16B for PFC and EAA, respectively. 16A shows the heterogeneous nature with an insoluble, non-porous fluorocarbon surface (shaded portion) coated with adsorbed surfactant molecules. 16B depicts an EAA polymer cluster comprising a porous, water-swelled structure with both hydrophilic and oleophilic characteristics.

Different APD compositions possess different physico-chemical properties. For example, the preferred upper limit of operating temperature in the case of acid-induced EAA flocculation is about 50° C. In contrast, acid-induced PFC flocculation can be effective at temperatures exceeding 100° C. Thus, the polymer composition will be selected to operate efficiently under the desired process conditions.

Interaction of APD Derivatives with Liquid Phases:

APD derivatives show strong interactions with liquid phases, such as variation in floc volume vs oil concentration and time (see Table 5a) and floc volume vs pH (see Table 5b).

EXAMPLES

All filtrations were done at a low pressure differential (about 4" H2O maximum) using a coarse cellulose No2 cone-type coffee filter, unless specified otherwise.

Example 1

Processing of Oily Mixtures

General Summary: Typically, dispersed polymer and desired additive(s) were added to the oil-water mixture and mixed for the desired retention time, yielding de-oiled water phase and polymer-oil condensed phase(s). Tests were run in batch and continuous flow-through modes. Depending on oil type, oil viscosity, operating conditions and nanopolymer composition, different oil: polymer ratios were found necessary to incorporate substantially all of the oil into a filterable oil-polymer gel/solid. Higher oil: polymer ratios gave mixtures of oil-polymer gel/solid and coalesced liquid oil phase.

Addition of soluble flocculants, viscosity modifiers, particulates and/or fibrous materials could increase clarification rates and/or reduce overall polymer consumption depending on feed type, desired flocculation rate, etc. Addition of dispersed gas phase caused enhanced flotation of the coalesced oil-polymer phase(s).

Various separation methods well-known to the art, e.g. screening, filtration, membrane filtration, flotation and so forth were used as appropriate to separate the polymer-oil phase(s) from the treated water. Typically, oily suspended solids, if present, were also incorporated into the polymer phase.

Free-phase oil treatment: Pre-flocculated porous nanopolymer solids derived from EAA were found effective in absorbing non-emulsified oil droplets and bulk oils floating on water surfaces.

Using hydro-philic/phobic control of the activated floc solids, remediation efficiencies can be maximized for oil spill clean-up and other bulk oil removal applications including absorbtion and membrane phase processing. Generating 'freshly hydrophobic' polymer macrosolids at the instant of application to non-dispersed/floating oils increased the effective oil solidification rate and polymer oil solidification capacity. A spill clean up vessel may generate these solids either on-board for slurry application to a spill, or at the tips of mixing nozzles injecting directly into the spill surface.

It is clear that various methods of spill cleanup may be practiced according to the present invention. In-situ versus ex-situ polymer application and pre-treatment selected for the polymer dispersion, slurry or porous solid will depend on a variety of factors.

Emulsified oil treatment: Numerous qualitative tests were performed to test phase inversion as a general emulsified oil removal procedure. Water phase clarification was observed for treated aqueous mixtures containing every oil or oily contaminant type tested including crude oil/produced water mixtures, bilge water, waste oil, oil from groundwater remediation operations, refined oil, solvent extraction reagent-carrier mixture, vegetable oil, mineral oil, edible oil, fish oil, essential oil, plant oil, non-dairy coffee creamer, milk, peanut oil, peanut butter, food residues, engine oil, lubricating oil, hydraulic oil, soluble cutting oil, silicone oil, bitumen, tar, drilling mud, coal tar, tar sand extract, animal oils and fats, soap, grease, butter, dairy product, paraffin, oil-based paint, linseed oil, DEET toluamide mixture, epoxy resin, alkyl amine, ethoxylated alkyl amine, ethoxylated alkyl phenol and so forth.

Further details for treatment of specific mixtures are described in Examples 1a-1g and Tables 1a-1h.

1a: Oil Solidification Via In-Situ Acid-Induced EAA Phase Inversion:

2.3 g of emulsified [waste-crude-kerosene (1-1-1)] in 450 ml water+20 ppm Ca, 2.3 g dispersed EAA (20% acrylic acid, ~6000 MW), HCl to pH<4, >5 min stir @ RT, coarse cellulose filter=clarified water plus oil-polymer solid.

1b: Oil Coalescence Via In-Situ Metal-Induced EAA Phase Inversion:

1,000 ml of 4,000 ppm 1:1 kerosene: bitumen emulsion, 20 ppm Ca, 2 ppm Al, 30 ppm EAA, ~10 min stir, ~5 min settle=clarified water+floating polymer-oil solid/liquid layer.

1c: Non-Emulsified Oil Removal Using EAA Phase Inversion Solids:

EAA phase inversion solids and slurries and were found to coalesce, absorb and/or solidify "free-phase" oil droplets or floating oil from water and liquid oils from surfaces. Capacities and rates varied with, e.g. porosity, pore size, oleophilicity, particle size, formulation, phase inversion additive, etc. Some of the solids had capacities of up to 5 or more times polymer weight in oil, which was recoverable from the solids by pressing.

1d: Shear-induced EAA/oil gel formation: Mixtures of EAA/oil/water exposed to appropriate levels of mixing shear were found to produce very stiff gels with lifetimes of several days to several weeks at low polymer doses relative to amounts needed for complete oil solidification. Air could also be incorporated into the gels. This property could be useful in e.g. immobilization of oil spills on water and where APD supply is limited.

1e: (i) EAA Recycle from Oily Flocs (A) 20.95 g of Teresso 32 TM lubricating oil in 2000 ml $H_2O$;+10 g EAA; +HCl to pH<4; filter=clarified filtrate+solid A (pressed wt=38.8 g)

(B) 30.35 g of solid A+50 ml hexane; press-filtration=18.21 g solid B.

(C) Solid B+NaOH ; 95° C.=dispersion C (D) Dispersion C+10 g Teresso 32; 2400 ml H2O; filter=clear filtrate+solid D.

(E) Steps (B) to (D) were repeated on solid D=clear filtrate+solid E (17.8 g).

(F) 7 dispersion-precipitation cycles were completed; in all cases, re-dispersed solids had good oil flocculation activity.

1e(ii) Re-dispersion of mixed APD polymer to yield new APDs: Re-dispersed products in some cases had superior phase inversion performance and re-dispersibility characteristics relative to the original non-phase inverted polymer admixture (see Table 1h, 7d vs 7e). It was also found possible to partially phase invert. APD mixtures prior to use with beneficial results (see Table 1 h, 9a-b).

1f: Removal of Water from Oil Via EAA-Cellulose 'Reverse Phase Inversion':

Composition: kerosene (250 ml)–water (7 g) emulsion; +NaOH (1 meq); +AP820 (1 mg); high shear mix 25C=milky kerosene; +7.2 g EAA-cellulose powder, 15 min stir 25 C=cloudy kerosene; heat to 60 C, ~1 min stir=powder agglomerated, water absorbed into polymer solids, clear kerosene phase.

1g: Treatment of Surfactants

1g(i) Soap (1.14 g); 650 ml water, 20 ppm Ca, 1.39 g EAA; 11 ml 1 N HCl, 5 m stir=clarified water+2.51 g dried solids. Wt calculated=2.53 g for 100% removal 1g(ii) Ethoxylated alkyl phenol: 440 ml water, 20 ppm Ca, 0.2% TritonX45 (TM), ~5 ppm phenol red, 0.55 g powdered carbon; 0.5 g EAA6000; 19 ppm Fe(III); 5 m stir, filter=Clear, colorless filtrate. COD's (Chemical Oxygen Demand, ppm): Feed=1120; Coarse filtrate=46, Fine (0.45 um) filtrate=17.

Tables 1a-h summarize data on samples obtained from various sources.

Thus, oil and soluble TOC were removed via acid-induced phase inversion of EAA

TABLE 1c

TREATMENT OF OILY GROUNDWATER EMULSION
(Stage 1 = EAA-oil solidification;
Stage 2 = 250 ppm Paraffin oil-EAA extraction of Stage 1 filtrate)

| Compound | Influent (ppb) | Effluent (ppb) | Removal (%) |
|---|---|---|---|
| Stage 1 TPH* | 42700 | 1200 | 97 |
| Total BTX* | 180 | 48 | 73 |
| Total PAH* | 175.6 | 1.8 | 99 |
| Stage 2 TPH* | 1200 | 590 | 50 |
| Total BTX* | 48 | 20 | 58 |
| Total PAH* | 1.8 | 1.2 | 34 |

*TPH = total petroleum hydrocarbons; BTX = benzene toluene ethylbenzenes xylene; PAH = polynuclear aromatic hydrocarbons TABLE 1a

CRUDE OIL - PRODUCED WATER SEPARATIONS

| ppm crude; additive | source | P*; ppm | aq. oil; ppm | Other |
|---|---|---|---|---|
| 1: 4,000 oil; 1-3 Al | oil = site1, aq = lab | 10-50* | <10 (turb.) | Settled 5-15 min |
| 2: 100,000 oil; 3-30 Fe 200 ml/m bench pilot | oil = lab, aq = site 2 | 20-50* | <1 ppm TPH | floc screenable from clear oil, aq phases |
| 3: ~10,000 heavy oil | o/w = site 3 | 4,000* | <1 ppm TPH | oil solidified, filtered |
| 4: ~2500 light oil, 2-20 Al | o/w = site 2 | 30-200* | <10 (turb) | Metals also removed; phenol = C polished |
| 5: 2,000-10,000 oil, 2-10 Al | o/w = site 2 | 30-70* | <10 (turb.) | 200 ml/m bench pilot |

*Dose ranges are for NaHEAA
Polymer types tested include: 1,5 = EAA, EAA-CBD; EAA-cellulose; EAA-SBDVP-trioctyl amine; EAA-AP820-Fe; PE; PE-EAA; EAA-Carbon. 2-4: EAA, EAA-AP820-Fe TABLE 1b

TREATMENT OF OILY $H_2O/D_2O$ MIXTURES

| Sample type | Polymer: | TOC in | TOC out |
|---|---|---|---|
| 1 | (a) 0.3:1 | 5500; | 2000*; |
| titration | (b) 0.7:1 | 2000 | 547** |
| 1 batch run A | 1.1:1 | 5500 | 1320* |
| 1 batch run B | 0.9:1 | 5500 | 1210* |
| 2 | (a) 0.5:1 | 4030; | 1360*; |
| titration | (b) 1:1 | 1360 | 482** |
| 2 batch run | 1:1 | 4030 | 652* |

"TOC" means total organic carbon;
*no visible oil in filtrate; and
**gas chromatography-mass spectrometry ("gc/ms") detection limit estimated at ~100 ppm.

Table 1b data illustrate oil solidification (Stage 1) and solvent extraction (stage 2). Obviously, higher stage 2 removals may be achieved via replacement of oil/EAA by a solvent/polymer combination with a greater affinity for aromatics.

TABLE 1d

CONTINUOUS TREATMENT OF OILY WATER
Acid-induced EAA phase inversion

| Oil in (ppm) | Oil out (ppm) | Polymer:oil | Removal (%) |
|---|---|---|---|
| 85 | 1 | 1.1:1 | >99 |
| 814 | 4 | 1:1 | 99 |
| 1786 | 2 | 1:1 | >99 |
| 101 | 3 | 0.9:1 | 97 |
| 126 | 4 | 0.7:1 | 97 |
| 189 | 3 | 0.5:1 | 98 |
| 378 | 2 | 0.2:1 | 99 |

TABLE 1e

EAA polishing of APD-oil-aluminum phase inversion mixtures

| APD1 | HCl | APD2 | Turb1* | Turb2 | NTU reduction, % | Observations |
|---|---|---|---|---|---|---|
| AF4530 | 0 | EAA6000 | >500 | 7.01 | >98.6 | |
| W830/256 | 0 | EAA6000 | 23.8 | 5.10 | 79 | |
| W830/256 | 0 | EAA8000 | 23.8 | 12.1 | 49 | |
| W830/140 | 2 | EAA6000 | 15.4 | 0.47 | 97 | |
| W830/177 | 2 | EAA6000 | 31.1 | 0.13 | 99.6 | |
| W830/397 | 2 | EAA6000 | 91.4 | 0.48 | 99.5 | |
| AirFlex 325 | 2 | EAA8000 | 911 | 0.55 | >99.913 | |
| ME68725 | 2 | EAA8000 | 14.01 | 0.40 | 97 | 33 NTU pre-HCl |
| ME68725 | 2 | MP4983 | 14.01 | 0.68 | 95 | 50 NTU pre-HCl |
| ME68725 | 2 | EAA-Rubber | 14.01 | 0.67 | 95 | 55 NTU pre-HCl |

*measured for APD1 + oil aqueous mixture
For polymer identification, see list in Example 3
***Test 22-31 base sol'n = 100 ppm Crude Oil Emulsion + 20 ppm Al + 500 ppm APD1 + 233 ppm APD2

TABLE 1f

Oil and iron removal from API separator effluent

| Sample ID | Ca (ppm) | EAA (ppm) | Turbidity (NTU) | Oil (ppm) | Fe (ppm) |
|---|---|---|---|---|---|
| Sample 1 | — | — | — | ~2,500 | 18.2 |
| Trial1 | 10 | 50 | 12.51 | 7.0 | 0.26 |
| Trial2 | 10 | 100 | 19.38 | 20 | 0.38 |
| Trial3 | 10 | 25 | 44.2 | 68 | 1.14 |
| Sample 2 | — | — | — | n.a. | 10.36 |
| Trial 1a | 0 | 50 | 14.1 (5 m mix; screen-decant) | 10 | 0.02 |
| Trial 1b | 0 | 0 | 3.95 (1a decantate, 15 m stir, filter) | 0.2 | 0.03 |

TABLE 1g

Some EAA-oil removal variables
Feed = ~800 ppm crude/waste/kerosene

| test | Ca | Al | APD (100 ppm) | time (m) | Filtrate oil, ppm |
|---|---|---|---|---|---|
| 1 | 20 | 0 | none | 3 | 525 |
| 2 | 20 | 9 | none | 3 | 120 |
| 3 | 20 | 0 | cel-EAA | 3, 20 | 45, 18 |
| 4 | 40 | 0 | cel-EAA | 3, 10 | 18, 12 |
| 5 | 20 | 1 | cel-EAA | 4 | ~1 |
| 6 | 20 | 0 | EAA1&2 | 3, 10 | 18, 12 |
| 7 | 20 | 5 | EAA2 | 3 | <1 |

EAA1 = Dow Primacor 5990,
EAA2 = Dow Primacor 5980

Table 1g 3-7 shows that 1-5 ppm Al removes oil turbidity faster and more efficiently than 20 ppm Ca when used with 100 ppm EAA or cellulose-EAA. Further, EAA and cellulose-EAA both removed circa 8 times their weight in oil There was no difference in performance of Dow EAA polymers of MW 6,000 or 8,000 in this test.

TABLE 1h

Oil removal: Effect of soluble polymer and APD formulation

| Test | APD/ppm | size nm | Al ppm | sol. plmr/ ppm | Filtrate; ppm 'oil'* | 'oil' removal % |
|---|---|---|---|---|---|---|
| 1a | none | — | 3 | AP820/3 | 48 | 94 |
| 1b | bentonite/100 | <35,000 | 2 | AP820/3 | <1 | 99.9 |
| 1c | ben/100; EAA/10 | — | 2 | 0 | ~60 | 93 |
| 2a | EAA/3 | ~25 | 2 | 0 | 54 | 94 |
| 2b | EAA/3 | ~25 | 2 | AP820/1 | <1 | 99.9 |
| 2c | EAA/2 | ~25 | 2 | AP820/0.67 | ~1 | 99.9 |
| 2d | EAA/10 | ~25 | 1 | 0 | ~30 | 97 |
| 2e | EAA/10 | ~25 | 2 | mucilage/10 | ~2 | 99.8 |
| 3a | PTFE/400 | 12,000 | 5 | 0 | 4 | 99.5 |
| 3b | PTFE/400 | 12,000 | 5 | AP820/2 | <1 | 99.9 |

TABLE 1h-continued

Oil removal: Effect of soluble polymer and APD formulation

| Test | APD/ppm | size nm | Al ppm | sol. plmr/ ppm | Filtrate; ppm 'oil'* | 'oil' removal % |
|---|---|---|---|---|---|---|
| 4 | Sty-Acr/100 | 30 | 5 | 0 | 3 | 99.6 |
| 5a | amide/100** | 500 | 7 | AP820/2 | ~15 | 98.3** |
| 5b | am-EA-Fe/200*** | — | 9 | 0 | <1 | 99.9 |
| 6a | Paraffin-PE/10 | 60 | 3 | AP820/1 | <1 | 99.9 |
| 6b | Paraffin-PE/3 | 60 | 3 | AP820/1 | <1 | 99.9 |
| 6c | Paraffin-PE/100 | 60 | 5 | 0 | ~1 | 99.9 |
| 7a | CBD/50 | 60 | 5 | 0 | ~180 | 79 |
| 7b | CBD/50 | — | 5 | AP820/2 | <1 | 99.9 |
| 7c | CBD/50; EAA10 | — | 5 | 0 | ~120 | 86 |
| 7d | CBD/50; EAA/50 | — | 7 | 0 | 100 | 88.5 |
| 7e | 1:1 CBD-EAA-Fe | — | 7 | 0 | 3 | 99.7 |
| 8a | PE 'phob'/200 | 12,000 | 3 | 0 | 30 | 96.6 |
| 8b | PE 'phob'/200 | 12,000 | 3 | AP820/1 | <1 | 99.9 |
| 8c | PE 'phil'/200 | 12,000 | 3 | 0 | 3 | 99.6 |
| 9a*** | EAA-AP820-Fe/3 | — | 2 | — | ~4 | 99.5 |
| 9b | EAA-AP820-Fe/6 | — | 3 | — | ~1 | 99.9 |

ALL: kerosene = 870 ppm;
Ca = 20 ppm, 5 m stir, filter.
APD = 1 aliquot except 2c, 9b = two aliquots separated by 30 s. 1a-c, 1aliquot AP820, 2-9;
AP820 = 2 aliquots spaced by 30 s, 30 s after Al (time 0).
*estimated from turbidity; other sources of turbidity will analyse as oil.
**results were highly variable due to fragility of flocs
***am-EA-Fe = 1% {1:1 EAA:amide + [$^2$/$_3$HCl + $^1$/$_3$Fe]/stir} + NaOH/90 degC.; EAA-AP820-Fe = ([1% EAA − $^1$/$_{16}$% AP820] + 27 ppm Fe)

The results summarized in Table 1h have several features worthy of note. Test 1a shows that 3 ppm soluble flocculant leaves significant oil in the filtrate while test 1b and 1c show that provision of suspended inorganic bentonite solids improves performance of soluble polymer but not EAA (cf 2d). Further, addition of small amounts of EAA without soluble polymer (2a, 2d) leaves significant oil residues in the filtrate. However, tests 2b,c and e show that addition of soluble polymer results in substantially complete oil removal even at low EAA doses.

The results for tests 2 discussed for EAA are reflected in tests 3 and 5-8 for other polymers, i.e. addition of soluble polymer enhances oil removal by APD.

Also illustrated in Table 1h are the effects of particle size: larger APD particles require larger doses for similar oil removal performance. Further, comparison of EAA/CBD admixture performance (7d) to that of a 1:1 EAA-CBD phase inversion-redispersion product (7e) shows that the formulation derived via phase inversion methods was superior to that of a non-inverted APD mixture.

Of particular interest in Table 1h is the comparison of performance between "hydrophobic" ("phob" in Table 1h) PE and "hydrophilic" ("phil" in Table 1h) PE. The "hydrophobic" form was created by wetting dry PE powder with isopropanol, then diluting with 9 volumes of water. The "hydrophilic" form was created by wetting the dry PE powder with isopropanol and adding directly to the stirred oil-water mixture. The data indicate that the process of in-situ phase inversion of the dispersed polymer from more to less hydrophilic states is an important factor in APD performance.

Of further interest in Table 1h are tests 9a and 9b, indicating that a combination product from the partial phase inversion of soluble flocculating polymer-APD mixture is useful as a de-oiling agent.

It will be obvious to those skilled in the art that the methods of the present invention may be combined with each other and/or with any other suitable method(s) to optimize performance.

Such techniques include gravity settling, absorption, adsorption, precipitation, electrostatic precipitation, heating, cooling, chemical addition, filtration, hydrocyclone treatment, centrifuging, flotation, gas flotation, hollow fibre phase separation, coalescence, ultrasonic treatment, exposure to electromagnetic radiation, microfiltration, nanofiltration, distillation, freezing, drying, solvent extraction, etc.

Example 2

Metal Processing

In addition to the aforementioned novel aspects, the processes of the present invention as applied to metal processing will be further discussed and compared with prior art methods in Examples 2a-2d.

2a: Titration of EAA with Mixed Metals:

500 ml sulfide ore leachate. Sequential EAA addition; 20° C./stir 5 m/filter/isolate solids, repeat.

EAA additions: Stage A=3.2 meq; Stages B to F=0.83 meq; Stage G=3.1 meq; Stage H=2.1 meq. Selected polymer-metal precipitates were analysed for metals content. The results are summarised in Table 2a.

TABLE 2a

ANALYSES OF EAA-MIXED METAL SOLIDS FROM MULTISTAGE TITRATION*

| Metal | Feed** | Stage A solid | Stage B solid | Stage F solid | Stage H solid |
|---|---|---|---|---|---|
| Al | 102.1 | 1650 | 5480 | 9390 | 54 |
| Sb | 0.153 | 2.8 | 17.5 | 1.2 | <0.3 |
| As | 1.013 | 25 | 13 | 7 | 3 |
| Ba | 0.0012 | <0.3 | <0.3 | <0.3 | 7 |
| Be | 0.009 | <0.3 | 0.6 | 2.1 | <0.3 |
| Bi | 0.001 | 12 | 1.1 | <0.3 | <0.3 |
| B | 0.088 | 11 | <0.3 | <0.3 | <0.3 |
| Cd | 0.206 | 3.1 | 3.2 | 7.1 | 3.4 |
| Ca | 29.32 | 1120 | 1420 | 2180 | 14600 |

TABLE 2a-continued

ANALYSES OF EAA-MIXED METAL SOLIDS FROM MULTISTAGE TITRATION*

| Metal | Feed** | Stage A solid | Stage B solid | Stage F solid | Stage H solid |
|---|---|---|---|---|---|
| Cr | 0.0036 | 6 | 5 | 10 | <3 |
| Co | 0.463 | 4.1 | 4.3 | 6.9 | 85.9 |
| Cu | 98.74 | 992 | 1570 | 3760 | 205 |
| Fe | 113.4 | 19000 | 9290 | 200 | <60 |
| Pb | 0.138 | 8.6 | 4.4 | 9.5 | 0.9 |
| Mg | 53.9 | 190 | 230 | 330 | 430 |
| Mn | 30.53 | 296 | 293 | 631 | 6650 |
| Mo | 0.0002 | 0.8 | 0.9 | 0.4 | <0.3 |
| Ni | 0.25 | <3 | 4 | 4 | 43 |
| Se | 0.002 | 49 | 39 | 23 | 12 |
| Ag | <0.0001 | <0.3 | <0.3 | <0.3 | <0.3 |
| Sr | 0.023 | 5 | 5 | 8 | 43 |
| Te | 0.0001 | 1.3 | 0.6 | <0.3 | <0.3 |
| Tl | <0.0001 | 1.2 | 0.5 | <0.3 | 0.4 |
| Sn | 0.0008 | 1.2 | 1.1 | 0.5 | 0.5 |
| U | 0.026 | 1.4 | 7.9 | 2.1 | <0.3 |
| V | 0.007 | <0.3 | <0.3 | <0.3 | <0.3 |
| Zn | 13 | 1320 | 1350 | 2550 | 11400 |

*All values are in ppm.
**Calculated from concentrate analysis divided by dilution factor of 19.85

2b: Reaction of Dispersed Latex with Copper and Iron Solutions:

2b(i) 600 ml of 1,000 ppm siliconized acrylic latex; ~320 ppm Cu; pH=8.5. 2 m stir; ~30 m settle=blue sinking floc+clear colourless supernatant. Decantate-Filtrate=<1 ppm Cu or >99.7% Cu removal. The blue solids released copper at pH ~5.5.

2b(ii) Similar results were obtained with Fe(III)- and Fe(III)/Cu(II)-latex mixtures. The metal-latex solids also absorbed kerosene from a water/kerosene mixture.

2c: Metal Oxide-Hydroxide Flocculation, Dispersion Regeneration and Metal Oxide-Hydroxide Concentrate Recovery:

Mixed metal oxide/hydroxide floc was produced from (Fe, Zn,Cu) sulfide ore leachate plus NaOH. Treatment of a first ore leachate aliquot with EAA at 15 C followed by warming to ~40° C. gave compact metal-polymer floc.

The mixed metal floc was re-dispersed (100 C aq. NaOH) and added to a second aliquot of ore leachate resulting in formation of a brown polymer-metal floc and blue solution, indicative of flocculative selectivity for iron over copper. This re-dispersion/re-precipitation cycle was repeated five times and resulted in increasingly brown precipitate and filtrates containing copper, i.e. copper-iron separation.

In similar experiments, iron oxide/hydroxide concentrate was separated from the re-dispersed phase via settling/decantation, thus providing an improvement to procedure 2a for the selective separation and production of purified metal concentrates and purified aqueous phase at much lower polymer consumption than anticipated by the prior art.

2d: Comparison of Present Invention and Prior Art for Copper Removal:

2d(i) Prior art method: Similar to that described in Vaughn et al, U.S. Pat. No. 4,747,954: 1,000 ml of DI water containing 3.6 ppm Cu(II) was stirred at 25° C. for 5 minutes with 0.042 g of EAA6000 (~7% excess). The filtered solution contained substantial unremoved copper-EAA dispersion and rapid filter fouling was observed. Similar results were obtained when a cellulose-EAA polymer dispersion was used.

2d(ii) Comparative example: In a comparison of copper removal capacity, 0.13 g Cu(II) in 1000 ml of DI water was mixed with 4 meq NaOH then 0.022 g of EAA6000 polymer, giving blue solids and colourless filtrate. In a comparative test of the method according to Vaughn, addition-of 0.022 g a EAA6000 polymer to 0.13 g Cu/1000 ml produced only a trace of blue solid and the filtrate was blue, indicating the presence of substantial unremoved copper.

2d(iii) EAA/emulsified solvent extraction, 1100 ml of 3.6 ppm Cu(II) in DI water was emulsified with 0.48 g of 1:1 w/w tri-n-octyl amine in kerosene. 0.4 g of EAA6000 was added as a 10% dispersion; a voluminous pale blue floc formed; addition of 1.44 g of 1 N HCl resulted in a less voluminous floc. Filtrate was substantially copper-free.

2d (iv) In a typical example of copper removal by acid-promoted polymer phase inversion, 4 ppm Cu(II) in 1,000 ml DI water and 0.08 g of EAA6000 (77% excess) were stirred 1 min at 25° C., then adjusted to pH ~4 using 1 ml 1 N HCl. Pale blue floc and a filtrate substantially free of copper were obtained.

2d(v) This example illustrates copper removal by metal ion-promoted phase inversion: 1 ppm Cu(II) in 10,000 ml of water containing 21 ppm Ca was stirred at 22° C. with 20 ppm of EAA6000 for 10 min. A green (copper-containing) floc was obtained. A similar preparation without addition of Cu(II) yielded colourless solids.

2d(vi) Selective removal and recovery of copper. 2,000 ml vol; 20 ppm Cu(II), 21 ppm Ca, 20 ppm Fe(III); +NaOH (2.5 meq);+EAA (25 ppm); 2 m stir; 20 m settle=circa 55 ml green floc; +0.5 meq acid=Cu leachate+solids; filter=~53 ml pale blue filtrate and 1.45 g pressed filter cake containing iron.

2d(vii) Removal of Cu was also achieved via flocculation with the non-EAA type polymer styrene-butadiene-vinyl pyridine (SBDVP) at approximately 0.6:1 Cu:polymer weight ratio.

Example 2d(i) shows that 3.6 ppm copper is not removed by 40 ppm EAA polymer dispersions when processed by the method of Vaughn. In contrast to this observation, 2d(iii to v) show that addition of appropriate amounts of co-additive and/or co-reagent including oil-chelant mixture, acid, and/or suitable non-target metal ion to dispersed EAA resulted in substantial removal of similar copper levels. Therefore, the results exemplify the significant differences of the present invention as compared to Vaughn.

Example 2b describes the use of a commercial latex of unknown formulation to treat copper and iron solutions. 99% metals removal was achieved. Example 2d(vii) illustrates use of a non-EAA derived polymer for copper removal. Thus, a variety of nanopolymer phase inversion-based processes are of utility in the treatment and processing of aqueous metal mixtures.

Example 3

Treatment of Suspended Solids

Nanopolymer floc processing of certain feeds containing solids in mixtures with oil and/or metals is described in preceding Examples 1 and 2. Additionally, a wide variety of other aqueous suspensions were successfully clarified via nanopolymer flocculation, including in a non-limiting sense suspensions of tar sand tailings, ore tailings, municipal sludge, industrial sludge, clay, carbon, yeast, protein, talc, blood, food residue, precipitated compound, etc. The procedures of the present invention may also be adapted to processing "non-phase invertible" APD mixtures as exemplified previously e.g. for oil-APD1 mixtures (Table 1e).

"Non-phase invertible" APD will refer to APD polymers and/or APD mixtures in which phase inversion and/or floc separation is difficult or inconvenient to achieve under the process conditions, as opposed to, e.g. the readily separated EAA-oil phases of Examples 1a and 1b. It has been found that separating such mixtures may be facilitated by addition of a readily phase invertible polymer such as EAA or a soluble flocculant e.g. AP820. This procedure may be useful for example in the treatment of mixtures in which the desired contaminant is optimally sorbed by a non-phase invertible APD, with the resulting APD-contaminant particles being removed via treatment using a phase invertible APD and/or a soluble flocculating agent.

Examples 3(a-e) and Tables 3(a-f) summarize data from typical experiments.

3a: Flocculation and De-Watering of Yeast:

3a(i) 1.0 g yeast; 1 meq NaOH; 1,000 ml water; 20 ppm Ca; 0.08 g EAA; 2 m stir, 3 m settle, decant-filter=clarified water+pressed solids (2.57 g; ~31% solids).

3a(ii): Time: settled floc volumes: 5 m: 40 ml, 15 m: 20 ml, 30 m: 20 ml.

3b: Inorganic coagulant/hydroxide co-flocculation: 4 ml 0.6N Al(III); 1.00 g yeast; 900 ml DI water; 2 m stir; 3 meq NaOH, 1 m stir, 0.005 g EAA, 15 m mix; 30 m settle=clarified supernatant+20 ml floc.

3c: Tables 3a-3f Summarize Other Results

TABLE 3a

EAA-LATEX RATIO VS FILTRATION RATE

| Latex:EAA | Filtrate/2 min (ml) | Turbidity, NTU |
|---|---|---|
| 13.3:1 | 92 | — |
| 50:1 | 40 | — |

TABLE 3a-continued

EAA-LATEX RATIO VS FILTRATION RATE

| Latex:EAA | Filtrate/2 min (ml) | Turbidity, NTU |
|---|---|---|
| 100:1 | 32 | 0-25 ml = 7.8; 95-120 ml = 0.34 |
| 200:1 | 29 | — |
| 500:1 | 28 (hazy) | — |

TABLE 3b

EAA - CELLULOSE AND EAA - YEAST FLOC DATA

| X:Plm/meq/l NaOH | Filter cake % solids | Recovery, % |
|---|---|---|
| Cel:EAA = 10:1/1 | 48 | 87 |
| Yeast:EAA/meq/l NaOH | | |
| 5:1/1 | 34 | 91 |
| 10:1/1 | 28 | 80 |
| 20:1/2 | 45 | 72 |

3(d) EAA Sludge Dewatering 14.73 g Fe/EAA/H2O sludge (~15% solids); water (50 ml); 0.2 g EAA (16% dispersion); 30 s stir; +HCl to pH<4; 1 m stir; +250 ml 100 C water=press-dewatered sludge (10.6 g; solids content=30%, for a 100% increase in solids % over starting Fe/EAA sludge.) summarizes data from similar tests except 100 C water was not added prior to pressing.

3(e) Preparation of phase invertible APD mixtures in-situ: The data in Table 3c illustrate that EAA-APD mixtures may be co-flocculated resulting in substantial removal of both-APD types.

TABLE 3c

APD1/APD2 FORMULATION SCREENING
500 ppm APD1; 20 ppm Ca; 20 ppm Al; EAA MW = 6000;
15 m stir; filter; +acid (opt)

| APD 1 | ml HCl | EAAppm | *NTU in | **NTU out | % removal | |
|---|---|---|---|---|---|---|
| 1 CBD | 0 | 116 | 733 | 0.41 | >99.9 | |
| 2 ML156 | 0 | 233 | 375 | 2.71 | 99.3 | |
| 3 ML110 | 0 | 233 | 150 | 1.02 | 99.3 | |
| 4 SBA | 0 | 233 | 468 | 0.31 | 99.9 | |
| 5 ME27720 | 0 | 233 | 1174 | 0.24 | >99.9 | |
| 6 BSVP | 0 | 233 | 193.5 | 0.50 | 99.7 | |
| 7 BSAA | 0 | 233 | 209 | 1.36 | 99.3 | |
| 8 EAA1410 | 0 | 233 | 755 | 1.6 | 99.8 | |
| 9 AF 315 | 0 | 233 | 1057 | 5.0 | 99.5 | |
| 10 Flbond325 | 1 | 233 | 842 | 0.2 | >99.9 | 13.2 NTU pre-HCl |
| 11 AF 4500 | 1 | 233 | 347 | 6.24 | 98.2 | 14 NTU pre-HCl |
| 12 AF 4530 | 2 | 233 | 423 | 0.83 | 99.8 | 14 NTU pre-HCl |
| 13 430Em | 2 | 233 | 576 | 0.50 | 99.9 | |
| 14 MP4983R | 2 | 233 | S/F | 0.47 | >99 | 19 NTU pre-HCl |
| 15 ME68725 | 2 | 233 | N/A | 2.04 | >98 | 17.45 NTU pre-HCl |
| 16 Mic05940 | 2 | 233 | 128 | 1.16 | 99.1 | |
| 17 Fstr 2774 | 2 | 233 | 678 | 0.67 | 99.9 | |
| 18 EAA/AP820 | 0 | 233 | S/F | 0.17 | >99.9 | |
| 19 EAA-Rubber | 0 | 233 | S/F | 0.50 | >99.5 | |
| 20 urethane | 2 | 233 | 91.7 | 0.39 | 99.6 | |
| 21 Soap | 0 | 233 | S/F | 0.15 | — | |

*Denotes nephelometric turbidity units
**Denotes reduction in nephelometric turbidity units
SF denotes self flocculating

| APD Polymer compositions | |
|---|---|
| Trade Name | Polymer Type |
| Primacor™ series (Dow Chemical Co) | EAA, pH~9; 25-90 nm; NS |
| EAA derivatives | Various |
| BAYPREN-LATEX T 58% | Chlorobutadiene ("CBD"), NS |
| BAYSTAL S X 8678 50% | Styrene - Butadiene; NS |
| ACRALEN BS 40% | Butadiene-Styrene-acrylamide-acrylonitrile-methacrylic acid; NS |
| LIPATON AE 4620 50% | Styrene-n-butyl acrylate; NS |
| PYRATEX 241 | Styrene-butadiene-Vinyl pyridine; NS |
| ABK: - AS 6800VP50% | Styrene-mod Acrylic-methacrylic acid ester; Anionic 30 nm |
| ABK: - H 595 30% | Styrene-mod Acrylic-methacrylic acid ester; Anionic 30 nm |
| ABK: - AC548 50% | Acrylic-Methacrylic acid ester; Anionic 60 nm |
| ML110, 25% | #1 Carnauba wax, PE, anionic; 60 nm; pH ~9 |
| ML180, 25% | #1 carnauba wax, paraffin; 180 nm; anionic |
| MG15, 40% | PTFE, 12,000 nm; anionic surfactant; pH8.5 |
| ME05940, 40% | Paraffin; 90 nm; nonionic |
| ME27720, 20% | Polyamide; 500 nm; nonionic |
| ME68725, 25% | PE type AC(TM)629, nonionic, 45 nm; pH~10 |
| ME39235, 35% | AC(TM)392 high density oxidized polyethylene; 35 nm, nonionic |
| ML156, 25% | #3 Carnauba wax; 130 nm; nonionic; pH~5 |
| AP: 4500 | Poly Ethylene-Vinyl Chloride |
| 4530 | Poly Ethylene-Vinyl Chloride |
| 315 | Poly Vinyl acetate |
| 325 | Poly Vinyl acetate |
| 430 | Poly Ethylene-VinylAcetate-VinylChloride |
| INCOREZ W830/140 | Polyurethane; Polycarbonate backbone; 7.3% co-solvent |
| INCOREZ W830/177 | Polyurethane; Polyester backbone |
| INCOREZ W830/256 | Polyurethane; Polycarbonate backbone; 8.4% co-solvent |
| INCOREZ W830/397 | Polyurethane; Polyether backbone |

(NS = no surfactant; "anionic" = anionic surfactant; "nonionic" = nonionic surfactant)
(ML = Michem Lube; ME = Michem Emulsion; MP = Michem Prime; MG = Michem Glide; ABK = ALBER-DINGK; AP = Air Products)

TABLE 3d

APD-CARBON FLOCCULATION
Mixture composition: 500 ml pre-settled carbon suspension/approximately 200 ppm APD/0.8 meq Fe

| APD composition | Visual observations | Filt. NTU* control | % removal vs |
|---|---|---|---|
| none (control) | black suspension | 14.6 | — |
| EAA6000 | fine fragile floc | 0.53 | 96 |
| Chlorobutadiene | fine fragile floc | 0.75 | 95 |
| Styrene-butadiene-vinyl pyridine | large robust floc | 0.34 | 98 |

*20 min settle, filter 2 × 100 ml, measure turbidity of second 100 ml aliquot;
**settle 30 m; decant top 100 ml

TABLE 3e

CARBON-APD FLOCCULATION VS APD TYPE
1,000 ppm C; 20 ppm Ca; Feed turbidity = ~152 NTU

| APD type | Polymer, ppm | % turbidity removal |
|---|---|---|
| none | 0 | 0 |
| S-BD-vinyl pyridine(SBDVP) | 5 | 92 |
| Chlorobutadiene (CBD) | 5 | 90 |
| EAA MP 4983R | 10 | 99 |

TABLE 3f

FLOC DEWATERING

| X: Polymer Type and dry wt Ratio | Pressed Filter cake; % | Recovery, % |
|---|---|---|
| Cellulose:EAA = 10:1 | 48 | 87 |
| Yeast(Y):EAA = 5:1 | 34 | 91 |
| Y:EAA = 10:1 | 28 | 80 |
| Y:EAA = 20:1 | 45 | 72 |
| Y:SBDVP:EAA = 60:5:1; +0.4 Fe/1.2 Cu | 48 | — |
| Cu:SBDVP = 0.6:1* | 36 | — |
| 0.3 Fe(III):11.6 CBD* | 71 | 95 |
| 1 Fe(III):39 EAA | 25 | — |
| 1 Fe (III):39 (1:1 EAA:CBD) | 26 | — |
| 1 Fe(III):39 CBD* | 71 | 95 |
| carbon:EAA = 10:1 | 40 | — |
| carbon:SBDVP = 10:1 | 45 | — |
| carbon:CBD = 10:1 | 42 | — |
| municipal sludge:EAA = 15:1 | 62 (60 C) | — |

*no metal observed in filtrate
SBDVP denotes a styrene-butadiene-vinyl pyridine copolymer

TABLE 3g

Effect of EAA formulation

| 20 ppm Al EAA derivative | filtrate turbidity, NTU |
|---|---|
| MP4183 (as supplied) | 1.22 |
| NaPE/EAA8000 | 0.22 |
| Cellulose/EAA6000 | 0.23, 0.15 |
| Rubber-EAA6000 | 0.18 |

TABLE 3g-continued

Effect of EAA formulation

| 20 ppm Al EAA derivative | filtrate turbidity, NTU |
|---|---|
| EAA6000/AP820 | 0.20 |
| PEVC/EAA6000 | 0.30 |
| Cu/EAA6000 | 0.18 |
| 5C/EAA6000 | 0.20 |
| 3C/EAA6000 | 1.00 |

The above examples clearly illustrate that the methods of the present invention can be used to flocculate and/or dewater a variety of aqueous suspensions, sludges, flocs and non-phase invertible polymer dispersions. Clearly, APD type(s) and process conditions will be chosen to maximize flocculation, clarification and de-watering characteristics for specific feeds.

Example 4

Processing of Soluble Non-Metallic Compounds

4a: Colour removal from commercial effluent: 500 ml blue fabric dye plant effluent+5.5 meq Fe(III); 1 m stir; 500 ppm EAA; 2 m stir; 1.1 meq Fe(III); 5 m stir=blue solid+colourless filtrate.

4b: Separation of dye components: (0.1 g blue+0.1 g yellow) food colour liquids+125 ml water=green solution; +1.0 g of EAA; +1.7 g 10 N HCl=blue solid+yellow filtrate, thus the yellow and blue dyes were separated by the treatment.

4c: EAA and pH-indicating dyes: A number of qualitative tests were performed on acidification of EAA-dye mixtures in water. Dyes included bromocresol purple, chlorophenol red, metacresol purple, dimethyl yellow, bromophenol blue and methyl violet. Phase inversion resulted in the formation of coloured polymer solids and partial colour removal from the aqueous phase, depending on factors such as EAA:dye ratio, pH, metal concentration, etc. The polymer solids underwent colour changes upon exposure to different pH's, all released dye when mixed with water at pH>~8.

4d: Non-EAA polymers: Similar results to 4c were obtained using non-EAA APD's including styrene-butadiene-vinyl pyridine, chlorobutadiene, styrene-acrylic, carboxylated styrene-butadiene and other formulations.

In combination with colloidal carbon, superior decolorization results were achieved. It is noted that functional groups including substituted aromatic hydrocarbon, phenol, cresol, halogen, sulfur-oxygen, carboxylic acid are contained in one or more of the dyes evaluated. Therefore, soluble organics having a variety of substituent types may be processed by the methods of the present invention.

Example 4e

Egg yolk (5 ml); 200 ml water; +0.5 g EAA; +10 ml 5% acetic acid; 5 min stir; filter=clear colorless filtrate+yellow solids. The presence of residual colorless organic compound(s) was inferred by the slight foaming tendency of the filtrate on shaking. Example 4e shows separation of egg yolk into components via nanopolymer phase inversion.

In addition to Examples 4a-e, soluble TOC removal is illustrated in Tables 1a and 1b, thus it is demonstrated that the present invention has utility in the processing of a wide variety of water-soluble organic materials.

Example 5

Effect of Selected Variables

5a: Filterability vs. Mixing Time:
21 ppm Ca plus 100 ppm EAA were stirred (medium speed magnetic stirrer setting) without aeration for the desired interval at 20° C. and filtered (coffee filter) until ~90% of filter flux was lost, yielding the following data:

Mix time (min: sec) 0:05 0:15 0:30 0:45 1:00 2:00 5:00 10:00 15:00 30:00

Filtrate volume (ml) 45 52 68 89 115 240 490 960 1,310>2,000

5b: Thermal and Aging Effect on Floc Volumes

5b(i): 1.5 g EAA, 500 ml H2O; +10 meq HCl; stir, settle; measure floc vol vs time 5b(ii): Procedure (i) was repeated using EAA MW 6000 polymer.

5b(iii): Procedure (i) was repeated using 1:1 EAA:PE mixture

5b(iv): Procedure (i) was repeated except 3 ml corn oil was also added to the mixture.

5b(v): Procedure (ii) was repeated except 3 ml corn oil was also added to the mixture.

5b(vi): Procedure (iii) was repeated except 3 ml corn oil was also added to the mixture.

5b(vii): Procedure (i) was repeated using 1.9 g EAA8000, 0.1 g Fe(III).

5b(viii) Procedure (vii) was repeated except equivalent amount of Cu was added

5b(ix) Procedure (vii) was repeated except equivalent amount of Al was added

Results are summarized in Table 5a.

TABLE 5a

THERMAL STABILITY OF NANOPOLYMER FLOCS

Relative floc volumes (ml/g) vs time, polymer type and additives

| | 5(i) | 5(ii) | 43(iii) | 5(iv) | 5(v) | 5(vi) | 5(vii) | 5(viii) | 5(ix) |
|---|---|---|---|---|---|---|---|---|---|
| Time(m); T~15 C. | | | | | | | | | |
| 1 | 50 | 74 | 74 | 6 | 6 | 10 | 100 | 100 | 95 |
| 10 | — | — | — | — | — | — | 100 | 88 | 88 |
| 30 | 33 | 67 | 60 | 2.7 | 5 | 3.3 | — | 25 | — |
| 60 | 27 | 50 | 47 | 2.7 | 3.3 | 2.7 | — | — | — |
| 240 | 10 | 17 | 14 | 2.7 | 3.3 | 2.7 | — | — | — |

TABLE 5a-continued

THERMAL STABILITY OF NANOPOLYMER FLOCS

Relative floc volumes (ml/g) vs time, polymer type and additives

| | 5(i) | 5(ii) | 43(iii) | 5(iv) | 5(v) | 5(vi) | 5(vii) | 5(viii) | 5(ix) |
|---|---|---|---|---|---|---|---|---|---|
| Temperature | | | | | | | | | |
| 50° C. | 2.7 | 4 | 3.3 | 2.7 | 3.3 | 2.7 | 50 | 17 | 65 |
| 100° C. | — | — | — | — | — | — | ~6 | 6 | — |

5c: Ca-EAA Floc Interactions:

A voluminous floc was prepared by extended shaking/aeration (about 10 min.) of 0.36 g EAA8000 polymer (added as a 13% dispersion) in 1 liter of water containing about 21 ppm of Ca. Floc volumes were monitored after ~15 min. settling as temperature and NaOH concentration were varied. A similar trial was run with PE dispersion. Results are summarized in Table 5b.

5d: Floc-pH Interactions

38(vii): A voluminous floc was prepared by extended shaking/aeration (circa 10 min.) of 0.36 g EAA in 1 l of 20 ppm Ca followed by treatment as summarized in Table 5c.

TABLE 5b floc volumes vs NaOH concentration, T and dispersion type

| | | floc volume (ml) | |
|---|---|---|---|
| Temperature(deg C.) | ml 1 N NaOH | EAA | PE |
| 20 | 0 | 200 | ~45 |
| 33 | 0 | 400 | ~45 |
| 40 | 0 | 300 | ~45 |
| 45 | 0 | 200 | ~45 |
| 50 | 0 | 100 | ~45 |
| 50 | 1 | 150 | floc disintegration |
| 50 | 2 | 200 | — |

Example 6

Soil Extraction Process Enhancement

General Procedure: A sandy soil containing 5 wt. % (heavy crude: train yard waste: used lubricating oil=1:1:1 (wt.)) was used as "soil" feed. Aliquots were extracted by stirring (5 m); compositions and extractions are presented in Table 9.

TABLE 9

EAA soil extraction

| Run # | soil, g | Surf., g | gasoline, g | EAA, g | % extraction |
|---|---|---|---|---|---|
| 1 | 16 | 1 | 0.1 | 0** | 30 |
| 2(i) | 16.1 | 1.5 | 0.1 | 1.0** | 88; |
| 2(ii) | 16.4 | 2.7 | 0.1 | 0.88 | 68 |
| 3(i) | 16.5 | 2.0 | 0.1 | 0.35** | to stage 2 |
| 3(ii) | Stage 2 | 4.6 | 0.1 | 0.46** | 108 |

150 ml aqueous phase;
15 C unless otherwise noted
*= ethoxylated nonyl phenol surfactant, 2.75% in water
**= plus 0.1 g NaOH The data in Table 9, 2(i) vs 1; indicate significantly improved performance of prior art surfactant-solvent mixtures upon addition of EAA to the composition. It is noted that for 2(ii), EAA nanopolymer without NaOH, the degree of performance enhancement is reduced, inferring a less optimized aqueous nanopolymer structure for the leaching process relative to 2(i). 3(i-ii) illustrate data from a two-stage leach/drain/leach process.

The invention claimed is:

1. A method of producing a composition containing a polymer having undergone phase inversion, said method comprising the step of:
    effecting phase inversion of a phase invertible water insoluble polymer dispersion from an aqueous composition where the water is the continuous phase, to produce at least one separable polymer-containing phase.

2. The method of claim 1, wherein said aqueous composition contains a contaminant to be separated from said aqueous composition, said method comprising the further steps of:
    (a) providing an aqueous composition, comprising:
       (1) a dispersible substantially water insoluble polymer capable of undergoing phase inversion; and
       (2) a contaminant; and,
    (b) forming at least one contaminant precipitated phase and a treated aqueous phase.

3. The method of claim 2, wherein said contaminant is a dispersed oil to be flocculated within said aqueous composition to obtain an oil enriched phase relative to the oil in said aqueous composition, said method comprising the steps of:
    providing an aqueous composition containing oil;
    providing an aqueous polymer dispersion of said polymer which is substantially water insoluble and is capable of undergoing phase inversion;
    forming an admixture of said aqueous polymer dispersion and said aqueous composition containing oil; and
    effecting phase inversion of said polymer in said admixture to form a flocculated precipitate and said oil enriched phase.

4. The method as defined in claim 1, said method being for enhancing a flotation process in which a first phase is floated relative to a second phase, wherein the steps include adding an aqueous polymer dispersion to a composition, said composition comprising said first phase and said second phase in which one of the phases is to be floated, said polymer of the dispersion being a dispersible substantially water insoluble polymer and being capable of undergoing phase inversion, and said step of effecting phase inversion of said polymer comprising effecting phase inversion to enhance floatation of at least one of said phases.

5. The method of claim 1, said method being for enhancing a sedimentation process, said method including the steps comprising providing an aqueous composition containing a first fraction and a second fraction, one of said fractions being removable from said composition as a sediment by the step of adding an aqueous polymer dispersion to the composition mixture during said process, said polymer of the dispersion being a dispersible substantially water insoluble polymer and being capable of undergoing phase inversion, said step of effecting phase inversion of said polymer enhancing sedimentation of one fraction of said composition is obtained.

6. The method of claim 1, said method being for treating oil to provide an oil product having improved properties comprising the steps of:
provloding oil containing one or more undesirable components;
providing an aqueous polymer dispersion of a polymer capable of undergoing phase inversion, said polymer being a dispersible substantially water and oil insoluble polymer;
providing an admixture of said oil and said aqueous polymer dispersion;
said step of effecting phase inversion includes phase inversion of said polymer in said admixture whereby said polymer coalesces or flocculates at least one of said undesirable components to thereby obtain a treated oil product having improved properties.

7. The method of claim 1, said method removing a contaminant from a mixture of soil and water and further comprising the steps of:
providing a soil containing oil or other contaminant leachable therefrom;
providing an aqueous polymer dispersion, said polymer being capable of undergoing phase inversion and being a dispersible substantially water insoluble polymer;
mixing together, under conditions which substantially inhibit polymer phase inversion, said aqueous polymer dispersion, said soil containing said contaminant, water and a surfactant to cause said contaminant to enter the aqueous phase; and
separating treated soil from the resulting aqueous phase.

8. A method of preparing an aqueous polymer dispersion with improved characteristics comprising the steps of:
providing a first aqueous polymer dispersion in which the polymer is substantially water insoluble;
adding a substance to said first dispersion, at a controlled pH and temperature sufficient to form a second aqueous polymer dispersion, which is substantially water-insoluble and which is capable of phase inversion.

9. The method according to claim 8, wherein the added substance is at least one substance selected from the group consisting of soluble polymer flocculating agent, aqueous polymer dispersion, acid, base, multivalent metal, cellulose, bitumen, rubber, oil, carbon, colloidal inorganic solid.

10. The method of claim 1, said method carrying out solvent extraction of metals from an aqueous mixture, said method further comprising the steps of:
providing an aqueous mixture containing metals and an emulsified solvent-chelant;
providing an aqueous polymer dispersion, said polymer being substantially water insoluble and being capable of undergoing phase inversion;
mixing said dispersion with said aqueous mixture;
creating a polymer phase inversion; and
separating a resulting polymer solid from the extracted solution.

11. The method of claim 1, said method carrying out selective extraction of metals from aqueous solution, said method further comprising the steps of:
providing an aqueous metal solution containing at least two different metals dissolved therein;
providing an aqueous polymer dispersion of a dispersible substantially water insoluble polymer, said polymer being capable of phase inversion;
mixing said dispersion with the said metal solution;
inducing polymer phase inversion under conditions to preferentially incorporate a said one of said metals into polymer solids resulting from phase inversion while the other metal remains substantially in dissolved form; and
separating said polymer solids from the selectively extracted solution.

12. The method of claim 1, said method enhancing a solvent extraction process and further comprising the steps of:
providing an aqueous solvent mixture;
providing an aqueous polymer dispersion, the polymer being capable of undergoing phase inversion and being substantially water insoluble; and
mixing said aqueous solvent mixture and said polymer dispersion to effect a polymer phase inversion and form a polymer solvent extract solid and extracted water phase substantially free of solvent.

13. The method of claim 1, said method extracting a soluble substance from water, said method further comprising the steps of:
providing an aqueous polymer dispersion, said polymer being substantially water insoluble and being capable of phase inversion;
providing an aqueous solution containing a substance to be extracted;
mixing said dispersion and solution such that polymer phase inversion occurs; and
producing a phase containing said substance and extracted water phase.

14. The method of claim 1, said method purifying a dispersible polymer further comprising the steps of:
providing a dispersible polymer to be purified, said polymer containing impurities, said polymer being substantially water insoluble and being capable of undergoing phase inversion;
preparing a dilute aqueous dispersion of the impure polymer; inducing a phase inversion in said dispersion; and
separating purified polymer.

15. The method of claim 1, said method producing polymer-additive solids with improved dispersibility further comprising the steps of:
providing an aqueous polymer dispersion-additive mixture, said polymer being substantially water insoluble and being capable of undergoing phase inversion; inducing a phase inversion under conditions to form a polymer-additive solid intermediate;
separating said intermediate solid;
re-dispersing said intermediate solid as a further aqueous phase;
removing undispersed material from said further aqueous phase;
inducing phase inversion of said intermediate polymer in said further aqueous phase; and
isolating from said further aqueous phase a refined solid comprising polymer and said additive wherein said refined solid exhibits improved dispersibility characteristics relative to said intermediate solid and said aqueous polymer dispersion-additive mixture.

16. The method of claim 1, for particulate flocculation, said method further comprising the steps of:
providing an aqueous mixture containing particulates;
providing an aqueous polymer dispersion of a water insoluble polymer capable of undergoing phase inversion;
mixing said polymer dispersion with said aqueous mixture; and effecting phase inversion of said polymer in the resulting mixture to thereby permit particulate flocculation.

17. The method of claim 1, said method forming a metastable or an activated aqueous polymer dispersion or slurry, said method further comprising the steps of:
   providing an aqueous polymer dispersion, said polymer comprising a water insoluble polymer capable of undergoing phase inversion;
   providing an aqueous mixture containing at least one additive chosen from acids and multivalent metals;
   mixing said aqueous mixture and said dispersion; and
   permitting said polymer to undergo phase inversion to thereby form said metastable or activated polymer dispersion.

18. The method of claim 1, said method forming a substantially water impermeable barrier in or on a substrate surface, said method further comprising the steps of:
   providing an aqueous dispersion of a dispersible substantially water insoluble polymer capable of undergoing phase inversion;
   applying said aqueous dispersion into or onto said substrate surface to form a zone of said polymer in or on said surface; and
   effecting phase inversion of said polymer while said polymer is in or on said surface to thereby form a substantially continuous barrier layer of a polymer in or on said surface.

19. The method as defined in claim 1, including the further steps of providing an article having a contaminant thereon or therein, treating said article with a leachate or solubilizing agent to leach or solubilize said contaminant prior to said step of effecting phase inversion of said polymer to remove said contaminant.

20. A stable aqueous dispersion composition containing multivalent metals of the formulation M1M2HP comprising:
   A substantially ionized ethylene-carboxylic acid copolymer P including ethylene-acrylic acid polymer of average molecular weight from about 4,000 to about 15,000 and associated cation mixture M1M2H;
   M1 being monovalent cations including ammonium and alkali metal, M2 being multivalent metal cations and H representing unionized carboxyl group; and
   where the ratio of equivalents of (M2 plus H) to equivalents of M1 is less than about 1:1.

21. Use of an aqueous polymer dispersion, the dispersion comprising a polymer which is substantially water-insoluble and which is capable of undergoing phase inversion, for removal of a contaminant from an aqueous mixture containing the contaminant, by effecting phase inversion of said aqueous mixture.

22. The method of claim 13, including the step of adding a solvent.

* * * * *